United States Patent [19]

Vinegar

[11] Patent Number: 4,987,368
[45] Date of Patent: Jan. 22, 1991

[54] NUCLEAR MAGNETISM LOGGING TOOL USING HIGH-TEMPERATURE SUPERCONDUCTING SQUID DETECTORS

[75] Inventor: Harold J. Vinegar, Houston, Tex.

[73] Assignee: Shell Oil Company, Houston, Tex.

[21] Appl. No.: 403,042

[22] Filed: Aug. 31, 1989

Related U.S. Application Data

[63] Continuation of Ser. No. 117.7??, ???. 5, 1987, abandoned.

[51] Int. Cl.$^5$ .............................................. G01V 3/00
[52] U.S. Cl. ..................................................... 324/303
[58] Field of Search ............... 324/300, 303, 304, 309, 324/314

[56] References Cited

U.S. PATENT DOCUMENTS

| | | | |
|---|---|---|---|
| 3,462,674 | 8/1969 | Baker et al. | 324/303 |
| 4,390,840 | 1/1983 | Ganssen et al. | 324/309 |
| 4,656,422 | 4/1987 | Vail, III et al. | 324/300 |
| 4,777,443 | 10/1988 | Yabusaki et al. | 324/322 |

FOREIGN PATENT DOCUMENTS 0190481  8/1986  European Pat. Off. .
1345848  2/1974  United Kingdom ............... 324/303

OTHER PUBLICATIONS

"NQR detected at 30 MHz with a DC SQUID", by C. Hilbert et al., Appl. Phys. Lett. 47(6) Sep. 15, 1985.

*Primary Examiner*—Michael J. Tokar
*Assistant Examiner*—Louis M. Arana

[57] ABSTRACT

A logging device is disclosed for measuring the nuclear magnetism response of earth formations. The device employs a detector that is capable of detecting sinusoidal and slowly varying changes in magnetic field caused by precession of mobile nuclei about the earth's magnetic field. Such a detector may be one or more laser-pumped helium magnetometers, or one or more high-temperature Superconducting Quantum Interference Devices (SQUID). The invention uses a micro-miniature Joule-Thomson refrigerator to maintain the high-temperature SQUIDs below their superconducting transition point. The SQUIDs are flux coupled in an axial gradiometer configuration to reduce motion-induced magnetic noise.

15 Claims, 3 Drawing Sheets

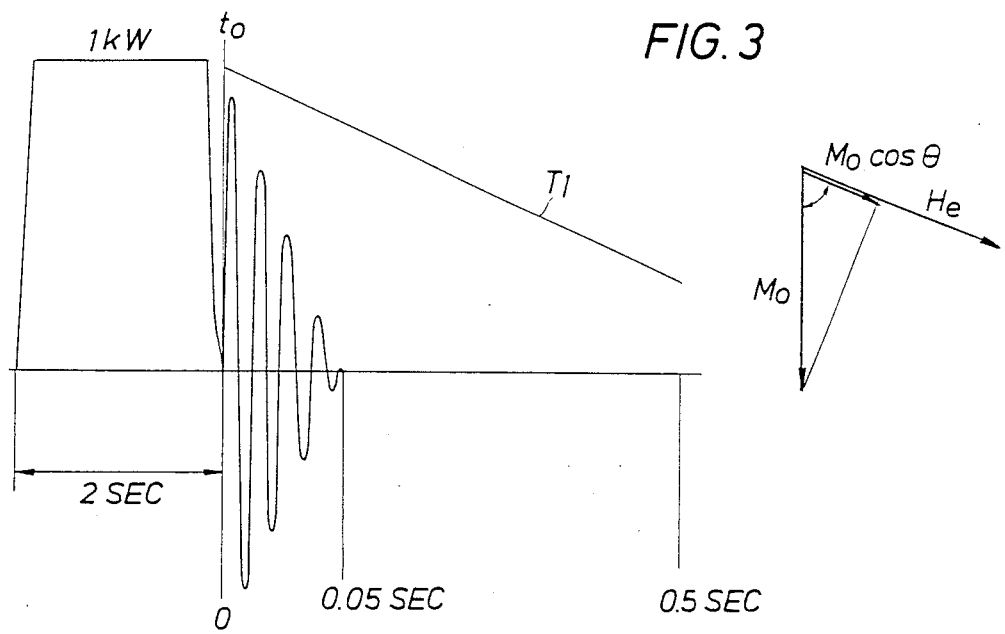
FIG. 3
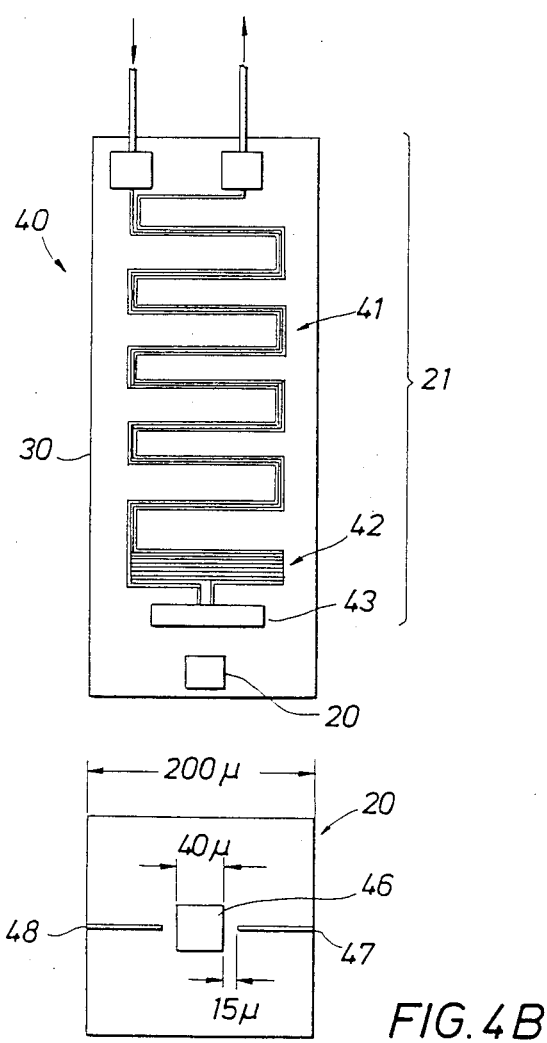
FIG. 4A
FIG. 4B
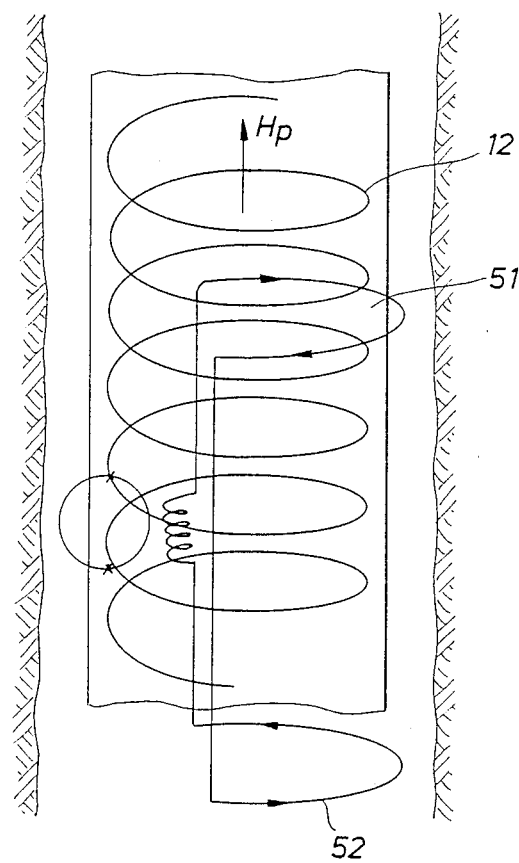
FIG. 5

NUCLEAR MAGNETISM LOGGING TOOL USING HIGH-TEMPERATURE SUPERCONDUCTING SQUID DETECTORS

This is a continuation of application Ser. No. 117,780 filed Nov. 5, 1987 now abandoned.

BACKGROUND OF THE INVENTION

This invention relates to apparatus for use in a borehole, and more particularly, relates to nuclear magnetism logging apparatus for use in an earthen borehole.

The most accurate open borehole logging device for measuring residual oil saturation and permeability in earth formations is the Nuclear Magnetism Log (NML). This logging tool uses the magnetic field from a solenoidal coil to polarize the Protons in any fluids contained within the earth formation adjacent the tool. The solenoidal coil is then turned off and any mobile protons influenced by the magnetic field of the solenoidal coil precess at their Larmor frequency about the earth's magnetic field. This precession may be measured as a damped sinusoidal voltage induced in a separate detection coil in the logging tool. The induced voltage decays rapidly, typically of the order of 20–50 milliseconds, because of extremely short spin-spin or transverse relaxation times, $T_2^*$, of these fluids.

The initial amplitude of the nuclear magnetism signal is proportional to the "free-fluid" or producible fluids in the formation adjacent the tool. If Mn-EDTA is added to the drilling fluid and allowed to invade the formation, then the only residual nuclear magnetism signal will be from any oil Phase in the formation adjacent the tool. Thus, a NML log-inject-log procedure results in highly accurate measurements of residual oil saturation in the formation.

The spin-lattice or longitudinal relaxation time $T_1$ of any fluid in an earth formation is related to the pore size(s) (and their distribution) containing the fluid; the pore sizes and distribution may then be related to the capillary pressure curve which may then be related to the permeability of the formation. (See for example, Loren, J. D. and Robinson, J. D., "Relations Between Pore Size, Fluid and Matrix Properties, and NML Measurements", Society of Petroleum Engineers Journal, September 1970, pp. 268–278 and Loren, J. D., "Permeability Estimates From NML Measurements", Journal of Petroleum Technology, August 1972, pp. 923–928.) The NML attempts to measure $T_1$ by repeated polarization cycles with successively longer polarization times. Since $T_1$ is very much longer than the time $T_2^*$ of the damped sinusoidal decay, $T_1$ cannot be determined directly from the damped sinusoidal decay curve with only one measurement.

Although a highly useful logging tool, one of the main disadvantages of the NML is its poor signal-to-noise ratio, which limits its accuracy to about 1 unit of porosity during continuous logging operation. Although this is adequate for measuring a free-fluid index, residual oil saturations are typically ⅓ or less of the total porosity, so that stationary NML operation is required in order to measure the residual of saturation to sufficient accuracy for enhanced oil recovery requirements. Typically, about 15 minutes of data is collected at a borehole location and then averaged to obtain residual oil saturation to better than 1 percent of saturation at that location. However, maintaining the tool stationary for this length of time slows data acquisition for the entire formation and increases the risk of sticking the tool in the borehole.

Another disadvantage of the NML is the shallow depth of investigation into the formation. Again, due to poor signal-to-noise ratio, only signals from the initial few inches of the borehole wall can be detected.

Still another disadvantage is that repeated polarization cycles are required to obtain a discrete number of measurements of the $T_1$ decay curve. This requires additional time, and since only a few measurements are obtained, the shape of the $T_1$ decay curve so obtained is not very precise. This $T_1$ decay curve then contains imprecise information on pore sizes and their distribution (and accordingly any capillary pressure or permeability determined therefrom is imprecise) in the formation, which is a severe disadvantage of the present NML tool.

The use of a Superconducting Quantum Interference Device (SQUID) as a detector in a modified nuclear magnetism tool has been proposed, with the modification being the use of two opposed superconducting magnets instead of the conventional polarizing solenoid to provide an increased depth of investigation into the borehole wall (J. A. Jackson, "New NMR Well Logging/Fracture Mapping Technique With Possible Application of SQUID NMR Detector" *SQUID Applications to Geophysics*, Proceedings of June 2-4, 1980 Workshop, los Alamos, N. Mex., pp 161–164, published by SEG, 1981). However, the use of a SQUID as a detector in a downhole device has not occurred because of the cryogenic and safety considerations of using liquid helium in the borehole environment. More specifically, liquid helium expands over 600 times on vaporizing and cannot be safely vented into the borehole. This problem, as well as that of providing an adequate amount of operating time downhole, in the high-temPerature environment oF a borehole, has so far prevented the use of a SQUID as a detector in a nuclear magnetism tool.

These and other limitations and disadvantages of the prior art are overcome by the present invention, however, and apparatus are provided for nuclear magnetism logging with a detector capable of detecting sinusoidal and slowly varying magnetic fields in an earthen borehole.

SUMMARY OF THE INVENTION

The present invention provides a logging device for measuring the nuclear magnetism response of earth formations using one or more detectors capable of essentially simultaneously detecting sinusoidal and slowly varying magnetic fields resulting from precession of mobile nuclei about the earth's magnetic field. Preferably such detectors are high-temperature Superconducting Quantum Interference Device(s) (SQUID). Alternatively one or more laser-pumped helium magnetometers may be used as detectors. The presently preferred apparatus of the present invention uses a micro-miniature Joule-Thomson refrigerator, or alternatively, thermoelectrically-cooled Peltier modules, integrally mounted on the same wafer as the SQUID(s) to maintain any high-temperature SQUID(s) below its superconducting transition temperature. Further, the SQUID(s) may be flux coupled in an axial gradiometer configuration to reduce any motioninduced magnetic field noise.

The preferred apparatus o: the present invention provides a means for using a SQUID sensor in a nuclear magnetism logging tool without the need for any cryogenic liquid cooling. The method consists of fabricating one or more SQUIDs from a high-temperature superconducting material, such as for example, but not limited to the rare earth-bariumcopper oxide materials, such as Yttrium Barium Copper Oxide (YBa$_2$Cu$_3$O$_7$), which is superconducting at temperatures exceeding 90° K. The SQUID(s) is epitaxially deposited on a high thermal conductivity substrate such as SrTiO$_3$ or MgO. The wafer substrate in turn is bonded to the cold stage of a micro-miniature Joule-Thomson refrigerator (or a Pettier module for higher temperature superconducting materials) which can cool down to about 80° K. A vacuum casing of non-metallic construction such as G-10 fiberglass surrounding the SQUID(s) and wafer provides thermal insulation to reduce the heat load and facilitate keePing the refrigerator cold stage at temperatures below the superconductIng transition temperature of the SQUID(s) material.

A SQUID detector and a laser-pumped helium magnetometer respond to all frequencies down to DC, while a resonant coil detector as used in the current state-of-the-art NML responds only to a narrow frequency range and has zero response at DC. Thus, a SQUID detector and a laserpumped helium magnetometer may essentially simultaneously and directly measure both a T$_2$* and T$_1$ decay in a single NML tool with a single measurement.

In addition to the SQUID elements, the SQUID electronics may also be thermally anchored to the refrigerator cold stage. This provides an additional performance improvement by reduced noise.

One or more SQUID detectors may be flux coupled to a superconducting axial gradiometer detection coil. This coil may also be constructed of a high-temperature superconductor material and may be thermally anchored to the refrigerator cold stage. The function of the detection loop is to increase the flux sensItivity of the detector. The axial gradiometer configuration is preferred to reduce flux noise from any motion of the logging tool in the earth's magnetic field while in the borehole. For this configuration, one loop of the gradiometer is centered inside the polarizing coil while the second counterwound loop extends outside the polarizing coil. Thus, the inside loop detects the full signal from any polarized protons in the formation, whereas the outside loop detects substantially no proton signal. A uniform field such as the Earth's magnetic field creates an equal and opposite flux through each loop so that the Earth's magnetic field is effectively cancelled. Similarly, the laser-pumped helium magnetometers may be used in differential pairs, with one inside the polarizing coil and the other fixed outside the polarizing coil.

Thus, the presently preferred apparatus of the present invention provides a SQUID detection module for use in a downhole logging tool that obviates the need for liquid cryogens, provides improved signal-to-noise for nuclear magnetism logging, and makes possible the direct measurement of the T$_1$ decay curve of the earth formation.

It is therefore an object of this invention to provide a nuclear magnetism logging device for obtaining signal-to-noise ratios several orders of magnitude above that of the present NML state of the art.

It is another object of this invention to provide an NML device that may measure the entire T$_1$ decay curve of an earth formation directly, without requiring successive polarization cycles.

These and other advantages and objects of the present invention will become apparent from the following detailed description, wherein reference is made to the figures in the accompanying drawings.

BRIEF DESCRIPTION OF THE DRAWINGS

FIG. 3 shows a typical NML signal detected using a SQUID as a detector instead of the resonant coil.

FIGS. 4A and B show a SQUID detector and microminiature Joule-Thomson refrigerator integrally constructed on the same wafer substrate, and the details of the SQUID detector, respectively.

FIG. 5 shows the axial gradiometer configuration of superconducting coils flux-coupled to a SQUID that may be employed in the present invention.

DETAILED DESCRIPTION OF PREFERRED EMBODIMENT

Figure 1:
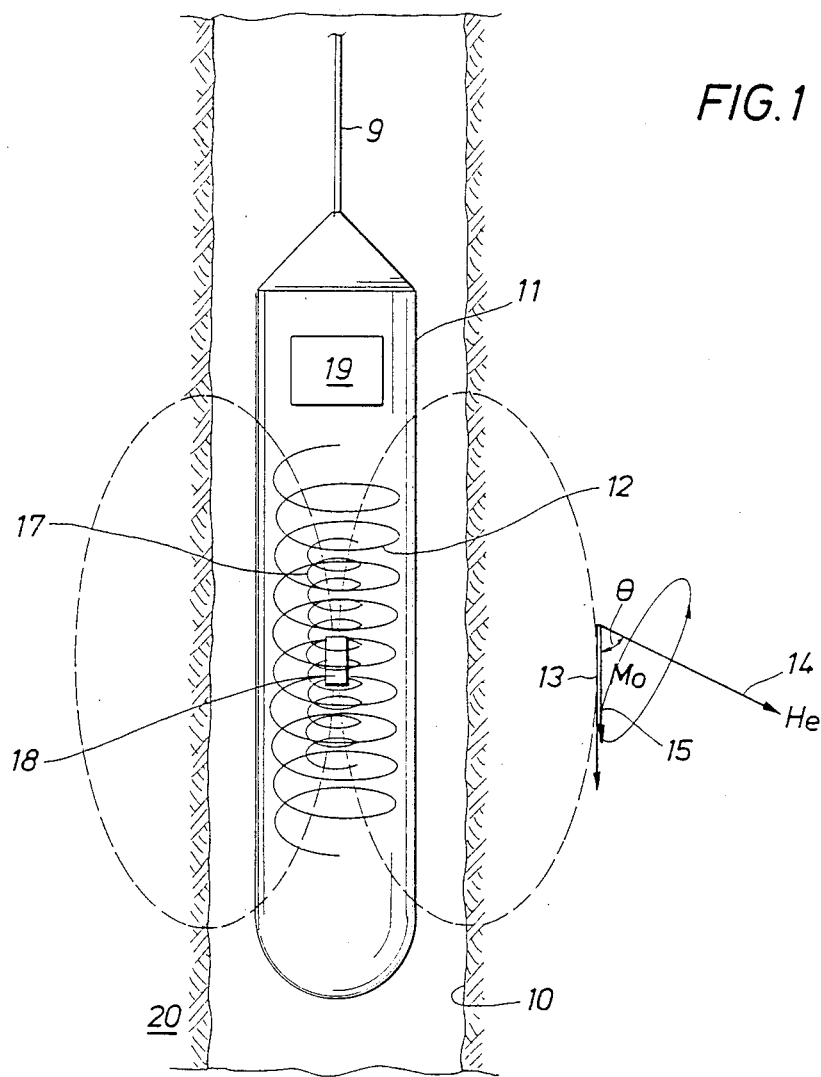
FIG. 1 shows a simplified block diagram of a nuclear magnetism logging tool, the magnetic field vectors associated with this nuclear magnetism logging tool and their relationship to the magnetic field of the Earth.

Referring now to FIG. 1, there may be seen a borehole 10 through an earth formation 20 and a nuclear magnetism logging tool 11 disposed in said borehole by cable 9. The logging tool 11 contains solenoidal coil 12 which generates a polarizing magnetic field vector 13 in the formation adjacent the tool. The earth's magnetic field, H$_e$, 14 is shown at an angle $\theta$ to the magnetization vector, M$_O$, 15 representing the polarized proton spins. After the polarizing field is turned off, the proton spins 15 precess around the Earth's field 14 as shown. If the detector is a resonant coil 17 that is tuned to the Larmor frequency, it detects the precessing proton spins M$_o$. An instrumentation package 19 provides about 1 Kw of power to polarizing coil 12 and detects the voltage induced in resonant coil 17 by the Precessing spins 15.

Figure 2:
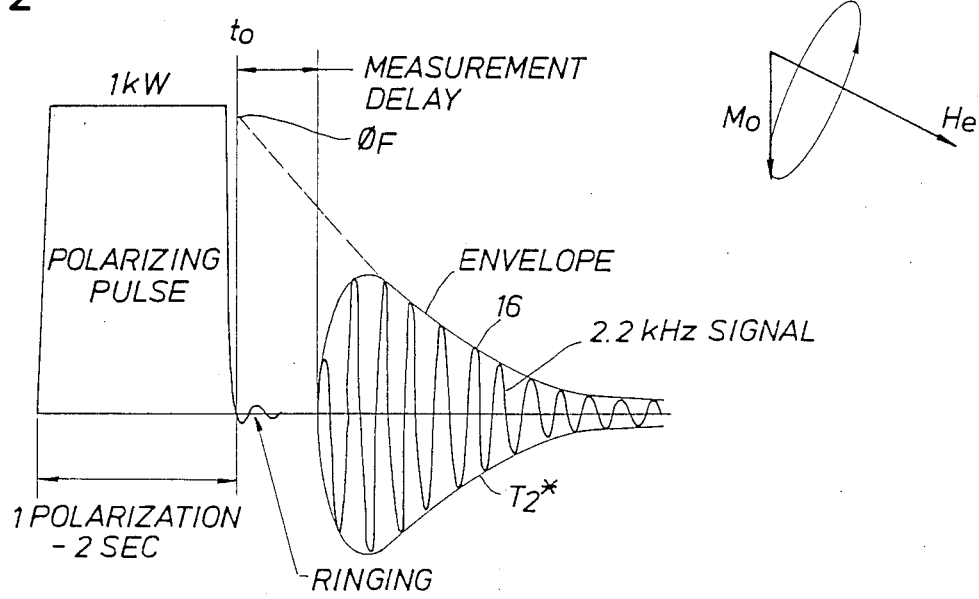
FIG. 2 shows a typical NML signal detected using a resonant coil tuned to the Larmor frequency.

FIG. 2 shows a typical signal 16 expected to be detected in resonant coil 17 by the precessing proton spins 15. The signal decays sinusoidally at the Larmor frequency with a time constant T$_2$* which is much shorter than T$_1$. T$_2$* rePresents the time constant for the decay of the envelope of the sinusoidal signal. The Larmor frequency of precession is $\gamma \times H_e$, where $\gamma$ is 4.26 KHz/g for the proton. Note the T$_1$ decay is not observed because the T$_1$ decay is of the order of one second which is far from the 2000 Hz Larmor frequency at which the resonant coil is tuned. FIG. 2 also shows the measurement delay discussed later herein and indicates (by dotted line) the extension of the signal envelope back to time t$_o$ indicative of $\phi_F$, the porosity occupied by free fluids in the formation adjacent the tool.

SQUID detectors have been found to have advantages over conventional resonant coils for detecting NMR signals in the laboratory. SQUIDs detect the magnetic field (more precisely, total magnetic flux) linking the detection loop, whereas conventional NHR cells detect a voltage (rate of change of magnetic flux) induced in the loop. Thus, SQUIDs respond at all frequencies down to DC (i.e., have a very wide frequency response), whereas resonant coils respond only to a narrow frequency range (determined by the Q of the coil) and have zero response at DC. The superiority of a SQUID as a detector over resonant coils is greatest for low NMR frequencies, long spin lattice relaxation times $T_1$, and short transverse relaxation times $T_2^*$. Further, other non-SQUID type detectors capable of measuring DC or near DC and having a wide frequency response, such as laser-pumped helium magnetometers may also be employed as detectors to detect both the $T_2^*$ sinusoidal decay and the slowly varying $T_1$ decay.

Long $T_1$ times and short $T_2^*$ times are substantially the conditions that exist for downhole nuclear magnetism logging of earth formations. The Larmor frequency for protons in the Earth's magnetic field is about 2000 Hz, a very low frequency compared to the 10–500 MHz used in laboratory NMR spectrometers. Secondly, the $T_1$ relaxation time of earth formations is fairly long, typically about 1.0 second, while the $T_2^*$ relaxation time is short, typically about 20–50 milliseconds. This high $T_1/T_2^*$ ratio found in downhole nuclear magnetism logging is the situation where SQUIDs or similarly sensitive, wide frequency response detectors are most advantageous over conventional resonant coil detectors.

A measure of the improvement in signal-to-noise (S/N) ratio of SQUID vs. resonant coil detection is given in the paper "New Technique For Improved Low-Temperature SQUID NMR Measurements" by R. A. Webb (Rev. Sci. Instum., Vol. 48, No. 12, pp. 1585–1594, December, 1977). For typical laboratory values of SQUID noise figure, coil Q, etc.

$$\frac{SQUID\ S/N}{COIL\ S/N} = 2.2 \times \frac{10^3 (T_1/T_2)^{\frac{1}{2}}}{(\omega_o)^{\frac{1}{2}}}$$

Using typical earth formation values of $T_1 = 1000$ ms, $T_2^* = 20$ ms, and $\Phi_o = 2^*\pi^*(2 \times 10^3) = 1.26 \times 10^4$, the SQUID S/N is a factor of 139 greater than the coil S/N.

Moreover, for NML logging, the improvement in S/N for a SQUID detector compared to resonant coil detector should be even greater because the conventional NML has a deadtime of about 25 milliseconds after the polarizing field is turned off. This measurement delay or deadtime is due to coupling and ringing between the polarizing coils and its circuitry, and the detection coils and its circuitry; this delay is illustrated in FIG. 2. Because the delay or deadtime is an appreciable part of the $T_2^*$ decay, a majority of the signal has decayed before the NML begins recording. For example, if $T_2^* = 25$ milliseconds and the NML deadtime is 25 milliseconds, then 1/e of the signal has decayed before detection even begins.

A SQUID or similar detector does not have this problem. Unlike the resonant coil, which is sensitive only to the rapid transverse dephasing of the nuclear spins ($T_2^*$) at the Larmor frequency and has no sensitivity at DC, the SQUID or similar detector measures the z-component of the magnetization at frequencies down to DC. Thus, even instrument deadtimes of the order of 25 milliseconds will not significantly reduce the signal level with SQUID or similar detectors. Such a similar detector that is a non-SQUID type detector capable of measuring DC or near DC, is a laser-pumped helium magnetometer; such magnetometers may also be employed as detectors to essentially simultaneously detect both the $T_2^*$ sinusoidal decay and the slowly varying $T_1$ decay.

In general, an optically-pumped magnetometer uses a lamp or laser containing an alkali metal or helium whose light is passed through a cell containing the vapor of the same element and impinging on a photodetector on the other side of the vapor cell. An optically-pumped magnetometer utilizes a population of electrons in this alkali vapor gas or in metastable helium to obtain a continuous measurement of the magnetic field intensity. The output of the photodetector is amplified and fed to a coil surrounding the vapor cell. This electric-optic system is an oscillator whose frequency is directly proportional to the magnetic field intensity. The magnetometer takes advantage of optical pumping to cause atomic or electron spin precession similar that employed by an NML to cause proton precession. Resonance absorption and reradiation of energy of various or specific resonant lines are a function of magnetic field intensity.

For downhole nuclear magnetism logging, another very important advantage of SQUIDs or similar detectors is that they may directly measure the $T_1$ decay curve. It is not necessary to apply repeated polarizing cycles to obtain the $T_1$ decay curve needed for pore size and permeability measurements. In order to measure the $T_1$ decay curve directly, a detector must respond at very low frequencies below 1 Hz, because $T_1$ is typically of the order of 1 second. Thus, SQUID or similar detectors are sensitive not only to the transverse dephasing of the spins but also to the thermal relaxation $T_1$. Since $T_1$ is typically 50 times greater than $T_2$ in earth formations, SQUID or similar detectors also may detect a signal for the much longer spin lattice relaxation time $T_1$.

FIG. 3 shows a typical signal expected to be detected if resonant coil 17 of FIG. 1 is replaced by a SQUID detector 18 and consists of a sinusoidally-decaying signal at the Larmor frequency with time constant $T_2^*$ which is proportional to $M_o \sin^2\theta$, as well as a nonsinusoidal component decaying with time constant $T_1$ which is proportional to $M_o \cos^2\theta$. The sinusoidal $T_2^*$ decay is due to the component of polarized nuclear spins perpendicular to the earth's field $H_e$, while the $T_1$ component is due to the component of nuclear spin aligned along the earth's field $H_e$. The Larmor sinusoidal $T_2^*$ decay can be separated from the near-DC $T_1$ decay using either an electronic low-pass filter, a copper eddy-current container as a shield around the detection coils, or a digital filter applied to the recorded data by realtime or postprocessing software. The longer $T_1$ decay will not be measured by coil 17 while SQUID 18 measure essentially simultaneously both the sinusoidal $T_2$ decay as well as the $T_1$ decay. However, other non-SQUID type detectors capable of measuring DC or near DC, such as laser-pumped helium magnetometers may also be employed as detectors to essentially simultaneously detect both the $T_2^*$ sinusoidal decay and the slowly varying $T_1$ decay.

FIG. 4A shows a SQUID detector 20 and a cooling module 21, which is preferably a micro-miniature Joule-Thomson refrigerator, on a substrate 30. Although only one SQUID detector 20 is shown in FIG. 4A, more than one such SQUID detector may be located on the substrate 30. The substrate 30 is itself used as the cold stage of the Joule-Thomson refrigerator. This provides excellent thermal contact between the SQUID and cold stage. Such thermal contact is required to provide the lowest possible temperature for the SQUIDs, so that their noise figures will be optimal. The SQUIDs are fabricated onto the substrate as close to the Joule-Thomson reservoir as possible to ensure maximum cooling. The SQUID may be of either the RF-biased or DC-biased type, although only the DC-biased type is discussed herein. The SQUID is made from high temperature superconducting material, such as, for example, but not limited to rare earth-barium-copper oxide materials. The term "hightemperature superconducting material" is used herein to mean a material whose superconducting transition temperature is about the boiling point of liquid nitrogen (i.e., ~77° K).

As shown in FIG. 4B, the DC SQUID consists of two granular weak links formed by epitaxial growth of a rare earth, barium, copper oxide material, such as $YBa_2Cu_3O_7$ on an appropriate substrate. The granular weak links are about 15 microns long and 1 micron thick and are defined by insulating gaps 47, 48; the weak links are said to be granular in that the weak link is actually between grains of the superconductor that are weakly Josephson-coupled. If the weak links are too narrow (<<15 microns) the current around central insulating portion 46 may become too high and quench the superconductor material causing the SQUID not to operate. Although, a square 46 is shown in FIG. 4B, other geometries may be employed. Similarly, if the weak links are too wide, too much current flows so that the "staircase" operating characteristics of a SQUID are not achieved and the SQUID does not operate properly.

Although $YBa_2Cu_3O_7$ is discussed herein as the preferred material for making the SQUID, any of the high-temperature superconductors, such as those with oxygen-deficient perovskite structure may be used. For $YBa_2Cu_3O_7$, the substrate should have a molecular structure similar to $YBa_2Cu_3O_7$ (for any other material employed for the SQUID, the substrate should have a molecular structure similar to that material) to achieve epitaxial growth, and should also be a good thermal conductor near liquid nitrogen temperatures to achieve good thermal connection to cooling module 21. Examples of such substrates may be, but are not limited to $SrTiO_3$ or MgO. For example $SrTiO_3$ has an "a" cell dimension of 3.9 Angstroms while $YBa_2Cu_3O_7$ has a corresponding cell dimension of 3.83 Angstroms. EPitaxial growth of oriented crystals is important in $YBa_2Cu_3O_7$ superconductors for achieving the highest possible critical fields and currents. Since it is preferable that the SQUIDs remain superconducting during the polarizing cycle (when they will be subjected to magnetic fields in excess of 1 kilogauss), the SQUIDS should preferably have a critical field ia excess of the strength of any anticipated polarizing magnetic field.

Epitaxial growth of the SQUID material on The $SrTiO_3$ substrate may be achieved by several techniques well known in the art, such as molecular beam epitaxy, electron beam evaporation, sputtering from single and multiple targets, pulsed excimer laser ablation of single targets, sol gel, and plasma oxidation. For example, in the molecular beam epitaxy method, a thin layer (~20 microns) of Y-Ba-Cu is first vapor deposited onto the $SrTiO_3$ substrate at the correct stoichiometry and then oxidized to $YBa_2Cu_3O_7$. Next a thin layer of gold is deposited on top of the $YBa_2Cu_3O_7$ layer. Finally, a photoresist layer is placed on the gold layer for photolithography patterning. The photoresist and gold are then ion milled in the SQUID pattern, i.e. removing the resist and gold covering central portion 46 and gaps 47, 48 shown in FIG. 4B; that is, the gold and resist are left above the portion of the layer designed to be superconducting. An oxygen ion beam of 0.3-3 MeV is then used to implant oxygen into the exposed $YBa_2Cu_3O_7$ of central portion 46 and gaps 47, 48, causing these areas to become an insulator, while the gold protects the portion of the pattern designed to be superconducting. Finally, the remaining gold is removed by ion milling, leaving a perfectly planar structure.

A plurality of SQUID sensors may be so constructed on the substrate. The advantage of having a plurality of sensors is that the SQUID noise of each sensor will be random and uncorrelated, and therefore, summing the SQUID outputs will result in further improvement in signal-to-noise ratio.

The micro-miniature refrigerator operates by Joule-Thomson expansion of a working gas, such as nitrogen. There are no cryogenic fluids or moving parts, which results in very low vibration and correspondingly low noise. Micro-miniature Joule-Thomson refrigerators are commercially available, such as for example, the System I refrigerator manufactured by MMR Technologies, Inc. of Mountain View, Calif. However, these MMR Technologies refrigerators are manufactured from glass or silicon and can not be used as an epitaxial substrate for $YBa_2Cu_3O_7$ SQUIDs. As shown in FIG. 4A, a microminiature Joule-Thomson refrigerator 40 has three main parts. These parts are a heat exchanger 41, an expansion capillary 42, and a liquid reservoir 43. The refrigerator may be constructed from a $SrTiO_3$ wafer 30 using the photofabrication technique. (See W. A. Little, "Microminiature Refrigeration", Rev. Sci. Insts. 35(5), May 1984). For example, in the photofabrication technique, a mask for the refrigerator portion such as that shown in FIG. 4A is first prepared. The wafer 30 may then be coated with a thick, water solution of gelatine activated with ammonium bichromate. The solution on the wafer 30 is then dried, covered by a mask, exposed to ultraviolet light through openings in the mask and then developed in hot water. This resist, when dried, forms a tough resilient coating which can withstand an abrasive etch with $Al_2O_3$ powder. The unexposed gelatine washes off in hot water leaving a pattern of unProtected $SrTiO_3$.

An abrasive etching is performed by exposing the wafer partially covered with resist to a blast of $Al_2O_3$ or other powder of sufficient hardness, in sizes ranging from 10-30 microns; this blast is scanned across the surface of the wafer. Channels of precisely controlled depth in the range of 2-100 microns and with nearly vertical side walls can be etched in the wafer 30 in this manner. The remaining resist is removed by chemical solution of the gelatine.

To complete the refrigerator portion, a cover plate is bonded to the etched wafer, using a variety of possible adhesives, such as low temperature epoxy. Some care must be taken to assure that the adhesive does not flow into the micron size channels.

The refrigerant working gas is contained in a pressurized tank, typically at pressures of 2000 psi, and allowed to expand through the Joule-Thomson refrigerator into a larger low pressure collection tank (not shown) within the logging tool. The collection tank is many times (typically at least 10 times) larger than the pressurized tank so that the expanded gas does not reach a high pressure and degrade refrigerator operation. Typical refrigerator operating times are about 12 hours with 1 liter of nitrogen gas at 2000 psi pressure. Alternatively, a closed cycle compressor could be used for the gas, although such moving parts will cause vibrations that may degrade signal-to-noise (S/N). Alternatively, a Peltier module may be used as a cooling module 21 when superconducting materials whose transition temperature is above about 180° K are used for SQUIDs, since the temperature down to which current Peltier modules may cool is about 180° K.

The refrigerator cold stage and SQUID may be surrounded by a vacuum can (not shown). The vacuum can provides a vacuum space necessary for reducing the heat leakage into the cold stage and the SQUID sensor. The vacuum can may be constructed of any non-metallic and non-magnetic material with low thermal conductivity at liquid nitrogen temperatures. Thin strips of superinsulation (i.e., aluminized solar) can be added within the vacuum space to improve thermal isolation of the SQUID. However, the strips must be cut vertically to reduce eddy currents in the superinsulation.

FIG. 5 shows the axial gradiometer coils that may be used in the practice of this invention. The function of these coils is to improve flux sensitivity and reduce magnetic noise from tool motion in the Earth's magnetic field. The pickup coils 51 and 52 are coaxial and counterwound so that a uniform magnetic field through the coils is exactly cancelled. One of the pickup coils 51 is centered inside the polarizing coil 12, while the other coil 52 is substantially outside the polarizing coil. The pickup coil 51 centered in the polarizing coil 12 will detect the maximum signal from the earth formation 20 while the pickup coil 52 outside the polarizing coil will detect substantially no signal from the formation. These coils may be flux coupled to one or more SQUIDs, or each SQUID may have its own set of coils.

However, the logging tool may also be operated with the SQUID itself as the flux sensor and with the tool clamped against the borehole wall to reduce vibration. If flux-coupled coils are used, the SQUID sensor is shielded from magnetic fields by a superconducting shield of $YBa_2Cu_3O_7$ surrounding the SQUID. The superconducting leads to the coil enter through small holes in the superconducting shield.

The gradiometer coils may be thin epitaxial films deposited on a $SrTiO_3$ substrate, similar to the SQUID fabrication. Alternatively, the coils may be made from short lengths of superconducting $YBa_2Cu_3O_7$ wire. This wire may be made from a gold or silver tube packed with a compressed powder of $YBa_2Cu_3O_7$. The tube is sealed, swaged to smaller diameter, then retired above 900° C. and allowed to slowly cool (~20 hours). Although wire made in this manner may not have the highest obtainable critical currents, values in excess of 1000 A/cm$^2$ may be obtained at zero magnetic field, and 200 A/cm$^2$ above 1000 gauss.

Similarly, laser-pumped helium magnetometer detectors may be employed in pairs, with one magnetometer inside the polarizing coil and one outside the polarizing coil. These two magnetometers are again differentially coupled to eliminate signals from motion in the earth's field.

Although a DC granular weak link thin-film type of SQUID has been described hereinabove, other tyPes of SQUIDS may also be fabricated according to the teachings of this invention. Among these are tunnel junction SQUIDS (superconductor-insulator-superconductor, superconductornormal metal-superconductor, and superconductor-semiconductor-superconductor), thin film weak links such as those of Dayem and Grimes, point-contact SQUIDs, and various hybrid combinations of thin film and point-contact SQUIDs. Similarly, the SQUIDs may be either single unction RF-biased tyPe or double junction DC SQUIDs.

Figure 6:
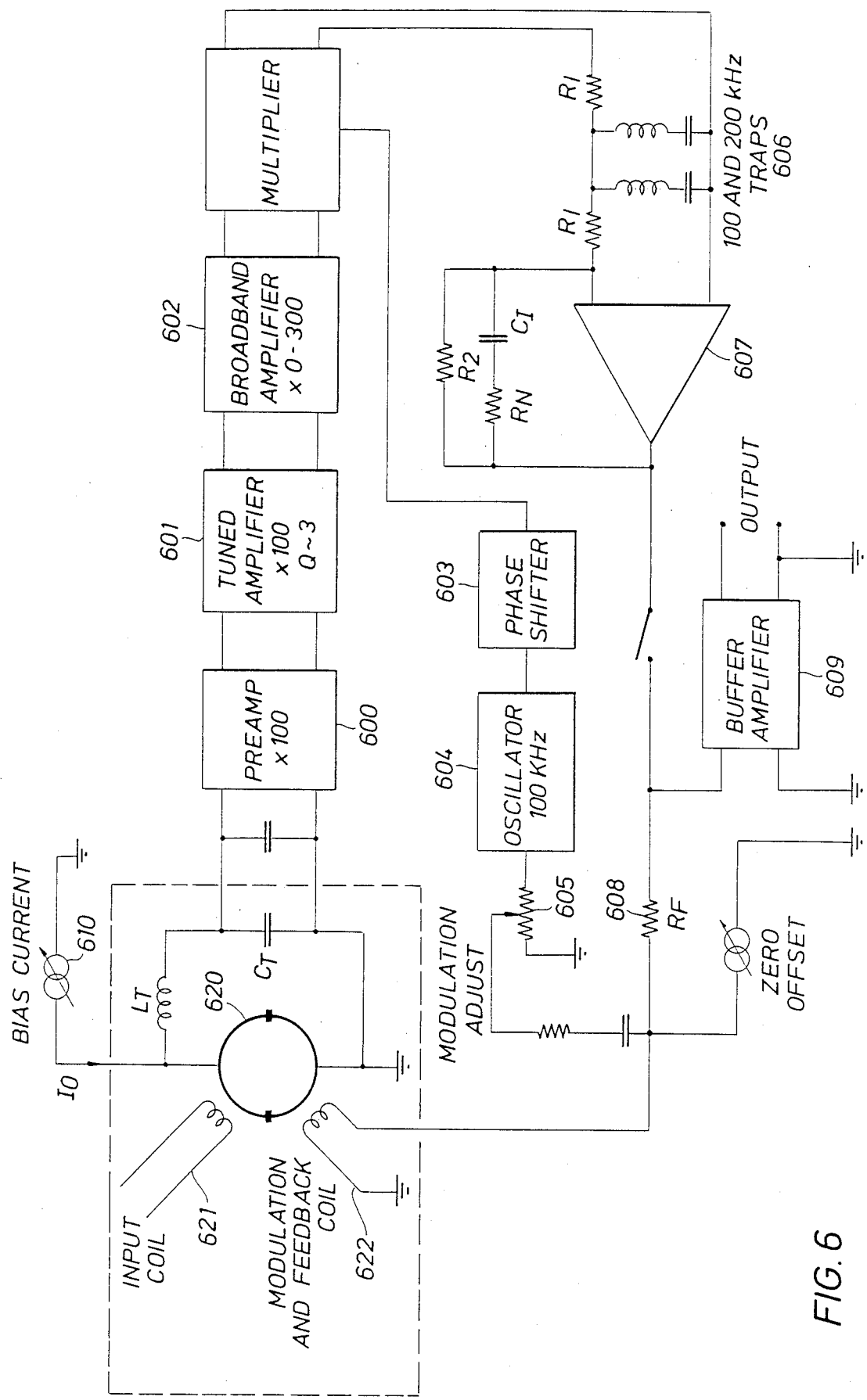
FIG. 6 shows typical measuring electronics for a SQUID detector.

FIG. 6 shows a block diagram of the electronics required for operating a DC SQUID 620, as is well known in the art. The electronics must consist of a bias current source 610, an amplification means 600, 601, 602, a modulation means 603, 604, 605, a feedback means 607, 608, a filter means 606, and a monitor means 609. At the present time, it is preferred that a DC SQUID be operated in a feedback mode so that the SQUID is maintained at a particularly sharp point on the SQUID's staircase current versus voltage operating characteristics, as selected by the bias current. The modulation and feedback may be at any frequency which allows the electronics to follow any changes in magnetic field in the logging tool. FIG. 6 shows a 100 KHz modulation oscillator 604.

More particularly, the detected signal is flux coupled into the SQUID 620 via the input coil 621. If the SQUID 620 is the detector itself, then input coil 621 is not present and the detected flux is the flux passing through the insulating, central portion of the SQUID (i.e., item 46 of FIG. 4B). The SQUID is modulated by modulation oscillator 604 at a frequency sufficient to allow the electronics to follow changes in the magnetic field by modulation and feedback coil 622. As the SQUID senses a change in magnetic field, the SQUID trys to move up or down the vertical portion of the selected operatIng point (selected by its bias current) on its staircase operating characteristic. The amplifier means 600, 601, 602 amplify this change which is then filtered by filter means 606 to provide unmodulated feedback, via feedback means 607, 608 and modulation and feedback coil 622, t©the SQUID 620. The feedback keeps the SQUID at its selected operating point. The amount and type of feedback is detected by monitor means buffer amplifier 609 and provided as an output to indicate changes in the magnetic field sensed by the SQUID.

Many other variations and modifications may be made in the apparatus and techniques hereinbefore described, by those having experience in this technology, without departing irom the concepts of the present invention. Accordingly, it should be clearly understood that the apparatus and methods depicted in the accompanying drawings and referred to in the foregoing description are illustrative only and are not intended as limitations on the scope of the invention.

What is claimed is:

1. A nuclear magnetism logging tool, comprising:
    means for providing a magnetic field that is capable of being energized or de-energized in response to preselected control signals,
    detector means for essentially simultaneously detecting both sinusoidal and slowly varying near D.C. changes in magnetic field when said means for providing a magnetic field is de-energized and outputting signals indicative thereof, and
    and electronics package for generating said preselected control signals and for receiving signals from said detector means.

2. A nuclear magnetism logging tool as described in claim 1, wherein said detector means is a laser-pumped helium magnetometer.

3. A nuclear magnetism logging tool as described in claim 1, wherein said detector means is a superconducting quantum interference device (SQUID).

4. A nuclear magnetism logging tool as described in claim 3, further comprising means for cooling said SQUID detector means for maintaining it at a temperature below the superconducting transition temperature of its superconducting material.

5. A nuclear magnetism logging tool as described in claim 1, wherein said means for providing a magnetic field is a solenoidal coil.

6. A nuclear magnetism logging tool as described in claim 3, wherein said SQUID employs a high-temperature superconducting material.

7. A nuclear magnetism logging tool as described in claim 4, wherein said means for cooling employs a Joule-Thomson refrigeration cycle.

8. A nuclear magnetism logging tool as described in claim 6, wherein said high-temperature superconducting material is substantially an oxygen-deficient perovskite.

9. A nuclear magnetism logging tool as described in claim 8, wherein said high-temperature superconducting material is substantially $YBa_2Cu_3O_7$.

10. A nuclear magnetism logging tool as described in claim 3 further comprising:
    a pair of superconducting axial gradiometer detector coils flux coupled to said SQUID, and wherein one of said coils is disposed within the means for providing a magnetic field and the other coil is disposed outside the means for providing a magnetic field.

11. A nuclear magnetism logging tool as described in claim 10, further comprising
    a superconducting shield disposed around said SQUID.

12. A nuclear magnetism logging tool as described in claim 4, wherein said SQUID and means for cooling are mounted adjacent each other on a thermally conductive substrate.

13. A nuclear magnetism logging tool as described in claim 12, wherein said substrate is $SrTiO_3$.

14. A nuclear magnetism logging tool as described in claim 12, wherein said substrate is MgO.

15. A method for nuclear magnetism logging, comprising:
    generating a magnetic field in a borehole,
    removing said magnetic field, and then
    essentially simultaneously detecting both the sinusoidal and slowly varying near D.C. magnetic fields resulting from precession of mobile nuclei about the earth's magnetic field.

* * * * *